(12) United States Patent
Ammon

(10) Patent No.: US 6,289,727 B1
(45) Date of Patent: Sep. 18, 2001

(54) ELEVATOR BRAKE

(75) Inventor: Urs Ammon, Ebikon (CH)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 09/362,512

(22) Filed: Jul. 28, 1999

(30) Foreign Application Priority Data

Jul. 29, 1998 (EP) ................................................. 98810729

(51) Int. Cl.[7] ........................................................ G01L 5/28
(52) U.S. Cl. ................................................................. 73/129
(58) Field of Search ........................... 73/129, 130, 131, 73/121; 340/453, 4

(56) References Cited

U.S. PATENT DOCUMENTS

| | | |
|---|---|---|
| 3,415,115 | 12/1968 | Newell . |
| 3,782,185 * | 1/1974 | Hassenauer et al. ................... 73/121 |
| 4,016,755 * | 4/1977 | Anderberg et al. ..................... 73/121 |
| 4,151,981 * | 5/1979 | Gennep ................................. 254/186 |
| 4,625,551 * | 12/1986 | Carnielli ................................. 73/379 |
| 4,805,741 | 2/1989 | de Jong et al. . |
| 5,255,760 * | 10/1993 | Lamb et al. ......................... 188/1.11 |
| 5,376,933 * | 12/1994 | Tupper et al. ........................ 340/984 |
| 5,402,863 * | 4/1995 | Okumura et al. ..................... 187/288 |
| 5,522,270 | 6/1996 | Gissinger et al. . |

FOREIGN PATENT DOCUMENTS

| | | |
|---|---|---|
| 37 07 276 | 9/1987 | (DE) . |
| 0 504 731 | 9/1992 | (EP) . |
| 62-75142 | 4/1987 | (JP) . |

\* cited by examiner

*Primary Examiner*—Benjamin R. Fuller
*Assistant Examiner*—Jewel V. Thompson
(74) *Attorney, Agent, or Firm*—MacMillan, Sobanski & Todd, LLC

(57) ABSTRACT

A torque-measuring device for an elevator brake measures the elastic deformation of active parts of a brake, for example, a shoe brake. In that case, regions with a reduced bending moment resistance are formed at the brake levers and elastically deform under the action of braking torque. The elastic deformation is detected by strain gauge strips arranged in these regions and connected as a measuring bridge and the generated voltage signals are provided to an elevator control as reference signals by an analog-to-digital converter and a microprocessor. The elevator control uses these reference signals to generate in a drive motor a motor torque compensating for the measured torque before the release of the brake. Thus, the resulting torque at the brake shaft is zero and a jerk-free start of the elevator car, without a torque jump, results therefrom after release of the brake.

10 Claims, 2 Drawing Sheets

ELEVATOR BRAKE

BACKGROUND OF THE INVENTION

The invention relates to a brake with a torque-measuring device, especially for elevators, wherein the brake, for example a shoe brake, has brake levers with brake shoes and wherein measuring elements of the torque-measuring device are connected with the brake levers.

Brakes with torque detection enable the generation of a counteracting torque of the drive motor by the amount of the measured torque, whereby the resulting torque at the brake shaft is equal to zero, so that the elevator can set off in jerk-free manner, thus without a torque jump, after release of the brake.

A torque-measuring shoe brake, which comprises measuring elements connected with the brake levers, has become known by German Patent Specification DE 37 07 276. The brake shoes are pivotably arranged at the brake levers by means of a rotary shaft, wherein the rotary shaft is mounted in the brake shoes by way of roller bearings. The rotary shaft is connected with one end of the measuring element, which measures the torque and which is so fastened by its other end to the brake lever that it forms a lever, the end of which connected with the rotary shaft is movable within narrow limits. Arranged at the opposite side of the shaft of the lever-like measuring element are strain gauge strips which, during measuring, produce a signal which is added to the signal delivered by the other brake lever. These signals are further processed and evaluated in such a manner that the brake is released only when the torque resulting from the loading is zero.

As the above-described device for measuring the torque consists of a number of interacting mechanical parts, the device is correspondingly relatively costly and complicated, which causes higher costs and can unfavorably influence the accuracy of the torque measurement.

SUMMARY OF THE INVENTION

The present invention is based on the task of proposing a brake with a torque-measuring device of the kind described in the introduction, which does not have the above-mentioned disadvantages and which, with simplest build-up, enables a jerk-free, comfortable setting off of the elevator.

The torque-measuring device according to the invention is distinguished by the fact that the effect of the elastic deformation of the material of a principal part of the brake fitting under force action, for example the brake lever of a shoe brake, is utilized for the measuring of a torque at a brake. The advantage of this measuring device is to be seen in that no additional mechanical transmission elements are needed for that purpose and that the measurement principle is also usable for other kinds of brakes, for example also for disc brakes.

The elastic deformation of the brake lever is registered by means which, directly mounted at at least one place at the brake lever, change their electrical properties in correspondence with the elastic deformation of the brake lever.

Regions, which experience a greater elastic deformation relative to adjacent regions under force effect, are provided at the brake levers by appropriate shaping. That produces, for the registration of the elastic deformation, similarly greater changes in the electrical properties of the registering means. Thus, also smaller amplification factors are needed for the further processing of the data from the changed electrical properties, which is of advantage for the measuring accuracy.

The shaping of regions which have a greater elastic deformation (stretching) relative to adjacent regions can be effected by, for example, a reduction in cross-section in these regions. A reduction in cross-section can also produce in simple manner a reduction in the bending resistance moment by correspondingly greater elastic deformations.

An advantageous and simple method for reduction in cross-section consists in providing a passage opening combined with outer constrictions at a desired place at the brake lever. An elastic deformation taking place under force effect is concentrated for the greatest part at these created narrow locations.

The means for registration of the elastic deformation are accordingly arranged at these narrow locations with the aforementioned effect of the largest possible changes, which are caused by the elastic deformation, in their characteristics in the form of measurable electrical data of these means.

The registering means are provided as strain gauge strips which are mounted in pairs at the narrowest locations and which in known manner change their characteristics, for example the resistance values, in correspondence with the elastic deformation of their support.

The strain gauge strips or the resistances thereof form a bridge circuit which is connected with a current supply and with a signal conversion circuit. The output of the latter is fed to a microprocessor for further processing for the drive control of the elevator. The drive control can be influenced by the signals of this torque-measuring device. That takes place in the manner that a torque, which corresponds with the measured torque, is produced in the drive motor before release of the brake. Thereby, there is no torque jump after the release of the brake and thus a jerk-free setting off is the result.

In the case of a shoe brake with this torque-measuring device the brake shoes can be immovably connected with the brake levers. That produces a simplification and a corresponding cost reduction not only for a shoe brake, but also for other brake types.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
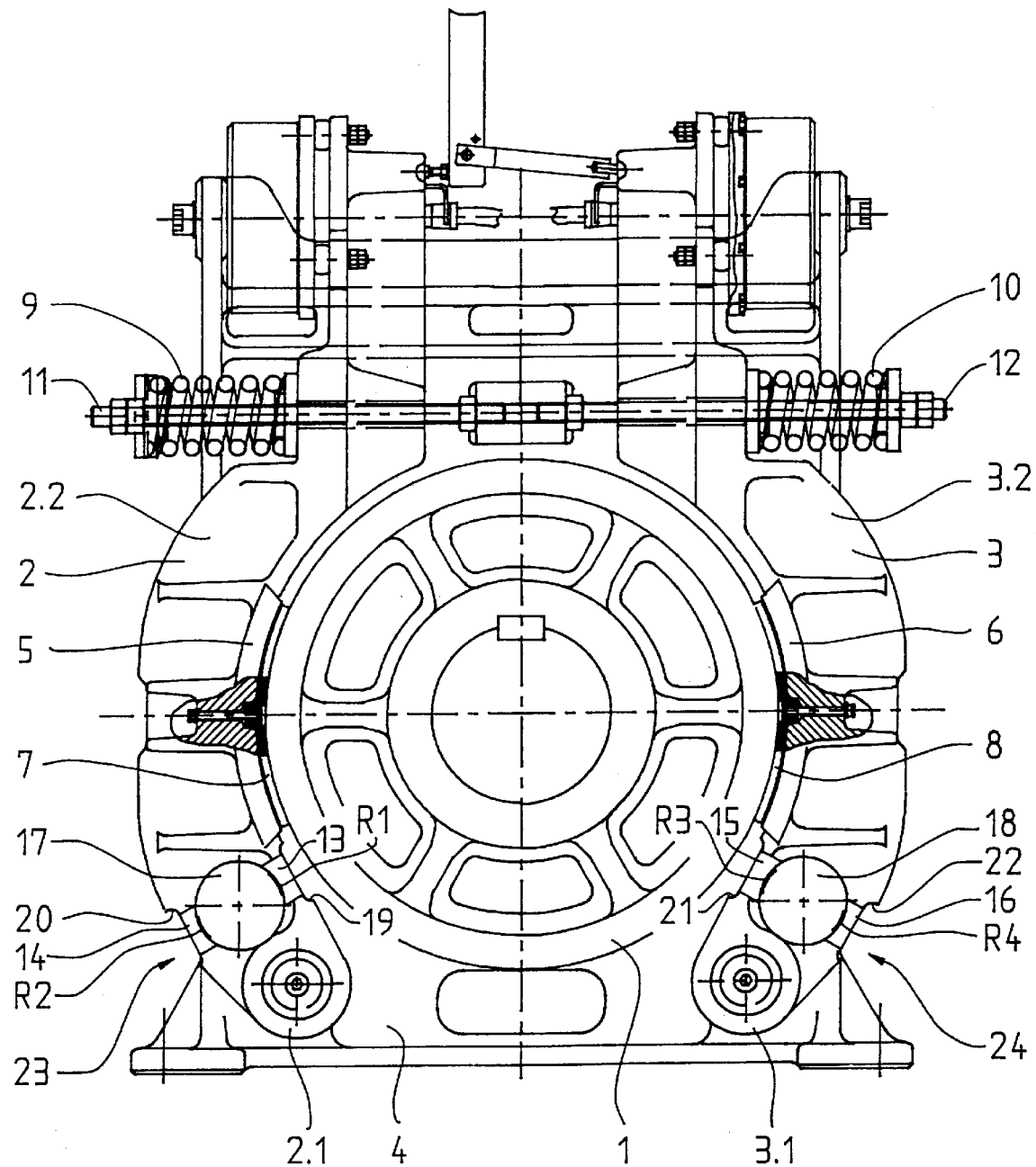
FIG. 1 is a side elevation view of the torque-measuring device in accordance with the invention mounted on a shoe brake.

In FIG. 1 a torque-measuring device according to the present invention is illustrated and explained by way of the example of a shoe brake. A brake drum 1 is rotationally connected with the drive of an elevator (not shown). Two brake levers 2 and 3 are pivotably mounted on a brake housing 4 at lower ends 2.1 and 3.1 respectively. Brake shoes 5 and 6 with brake linings 7 and 8 respectively are immovably fastened to the brake levers 2 and 3 respectively. Upper ends 2.2 and 3.2 of the brake levers 2 and 3 respectively are connected by way of brake springs 9 and 10 respectively and tie rods 11 and 12 respectively with the brake housing 4 and with a brake release device which is known per se and not described in more detail. Provided in the vicinity of the pivotable mounting at the lower ends 2.1 and 3.1 of the brake levers 2 and 3 are regions 23 and 24 respectively with a reduced bending resistance moment in the form of narrow locations 13, 14 for the region 23 and 15, 16 for the region 24 which form measuring elements and are formed by, for example, circular through passages 17 and 18 respectively in the brake levers 2 and 3 respectively and constricting shapings 19, 20 and 21, 22 respectively at the curved longitudinal sides thereof. Measurement signal generating devices R1, R2 and R3, R4 in the form of strain gauge strips are mounted directly on the brake levers at the narrow locations 13, 14 and 15, 16 respectively and are arranged opposite one another at the edge of the through passages 17 and 18 respectively. The brake levers 2 and 3 are elastically deformed at these narrow locations 13, 14 and 15, 16, which are found by analytical consideration, during the torque or load measuring, wherein, as described more closely in the following, the deformation and thus the signals or electrical data corresponding to the torque or the load are provided.

Figure 2:
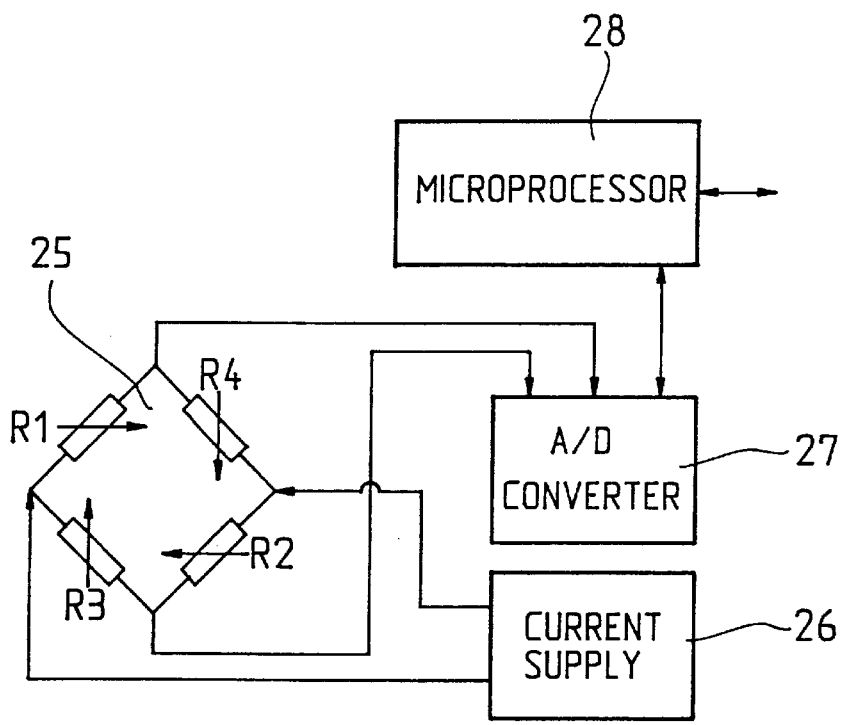
FIG. 2 is a block circuit diagram of an evaluating electronic system of the torque-measuring device.

Each of the brake levers 2 and 3 requires at least one of the signal generating devices R1 through R4 for generating an electrical signal corresponding to an amount of elastic deformation of the associated brake lever. As shown in the FIG. 2, the strain gauge strips R1, R2 and R3, R4 are arranged in respective oppositely disposed branches of a bridge circuit 25. The bridge circuit 25 has an input connected with a current supply 26 and an output connected with an analog-to-digital converter 27, which is connected by way of a microprocessor 28 with a elevator control, which is not further illustrated and described. The bridge 25, which in an unloaded state is balanced to zero, is asymmetrical by the change in the resistances of the strain gauge strips R1, R2, R3 and R4 when the brake levers 2 and 3 are loaded by torque and delivers a positive or negative voltage signal with a value corresponding to the amount and the direction of the prevailing torque. The voltage signal is fed through the converter 27 and the microprocessor 28 to the drive control as a torque reference signal for the torque to be compensated by the drive motor.

This torque compensation is either achieved in that the drive regulator in the drive motor allows creation in the drive motor directly of a torque which corresponds to the signal level and counteracts the loading or, more simply and more accurately, in that before release of the brake the regulator allows the torque in the motor to rise until a zero signal of the measuring bridge 25 of strain measuring gauges reports a brake loading of zero.

Figure 3:
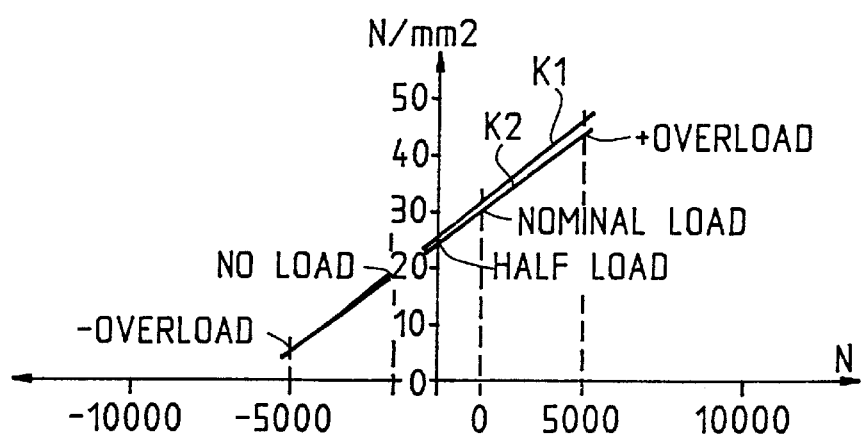
FIG. 3 is a graph of the voltages of measuring elements of the torque-measuring device versus the frictional force at the shoe brake.

In the FIG. 3, there is shown a plot of voltage versus force wherein the abscissa is assigned to the friction force at a shoe brake or the load states (in Newton N) and the ordinate is assigned to the voltages (in Newton per square millimeter N/mm$^2$) at the narrow locations 13 and 14 of the brake lever 2, wherein characteristic curves K1 and K2 illustrate the voltage course at the narrow locations 13 and 14 for different friction forces or load states of the elevator.

As strain gauge strips R1 to R4 there can be used such with a resistance winding, or semiconductor elements in which resistance paths are diffused into a semiconductor substrate of silicon.

The principle, in accordance with the invention, of the torque-measuring device by means of measurement of the elastic deformation of a brake lever can equally be used in the case of a disc brake. In that case, the means for measuring the elastic deformation are arranged in analogous manner at the brake levers, also designated as limbs, of the caliper of a disc brake. Analogously, regions with a bending resistance moment reduced relative to adjacent regions are similarly provided at these brake levers of the brake caliper and the means for measuring the elastic deformation are arranged in the former regions.

The use of the principle, according to the invention, of torque measurement is independent of the type of brake release device.

In principle, any part, which is loaded with the brake torque in whatever manner, at a brake can be provided for the torque-measuring device according to the invention.

Further solutions are possible and usable for the formation of a region with increased stretching, apart from the illustrated local reduction in the material cross-section. For example, zones with increased elasticity can be produced by local change in the material properties of a brake lever by means of a metallurgical process. Alternatively, through introduction of material with a lower modulus of elasticity into the measurement regions, higher stretchings are achieved there, wherein this introduced material shall have a finn connection with the brake lever material.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A brake for an elevator comprising:
    a rotatable portion to be braked;
    at least one brake lever having a brake shoe for applying a force to said portion of the elevator brake; and
    a torque-measuring means connected to said brake lever for measuring an elastic deformation of said brake lever during an application of said force to said portion of the elevator brake through said brake shoe.

2. The brake according to claim 1 wherein said torque-measuring means includes at least one signal generating device for generating an electrical signal corresponding to an amount of elastic deformation of said brake lever.

3. The brake according to claim 1 wherein said brake lever has at least one region of a relatively smaller cross-section with a smaller bending resistance moment relative to a larger cross-section and a larger bending resistance of adjacent regions thereof and said torque-measuring means is mounted in said one region.

4. The brake according to claim 3 wherein said one region of said smaller cross-section has at least one of a passage formed therethrough and a constricting shaping thereof.

5. The brake according to claim 3 wherein said torque-measuring means includes at least one resistive strain gauge strip for measuring the elastic deformation of said brake lever.

6. The brake according to claim 3 wherein said torque-measuring means includes at least one semiconductor element for measuring the elastic deformation of said brake lever.

7. The brake according to claim 1 wherein said brake shoe is immovably fastened to said brake lever.

8. A brake for an elevator comprising:
    a rotatable portion to be braked;
    a pair of brake levers each having a brake shoe for applying a force to said portion of the elevator brake; and a torque-measuring means mounted to each said brake lever for measuring an elastic deformation of said brake levers during an application of said force to said portion of the elevator brake.

9. The brake according to claim 8 wherein said torque-measuring means mounted to said brake levers are connected in a bridge circuit forming oppositely disposed branches of said bridge circuit having an input and an output and including a current supply connected to said bridge circuit input, said bridge circuit generating at said bridge circuit output a voltage signal representing an amount of elastic deformation of said brake levers.

10. The brake according to claim 8 including an analog-to-digital converter connected between said bridge circuit output and an input of a microprocessor for generating a torque reference signal to an elevator control connected to an output of said microprocessor in response to said voltage signal.

\* \* \* \* \*